C. B. CUMMONS.
HORSE DETACHER.
APPLICATION FILED JUNE 3, 1913.
1,098,229.
Patented May 26, 1914.
4 SHEETS—SHEET 2.
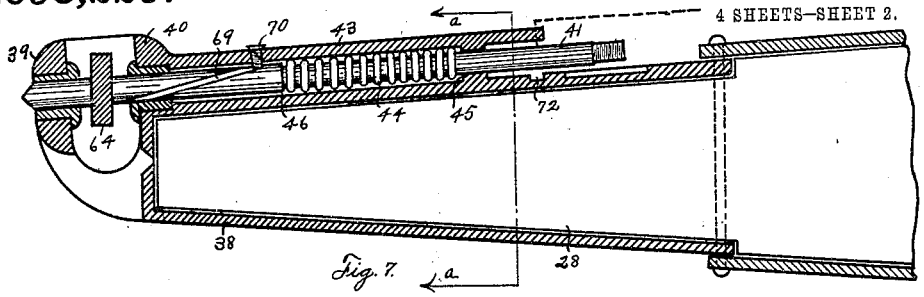
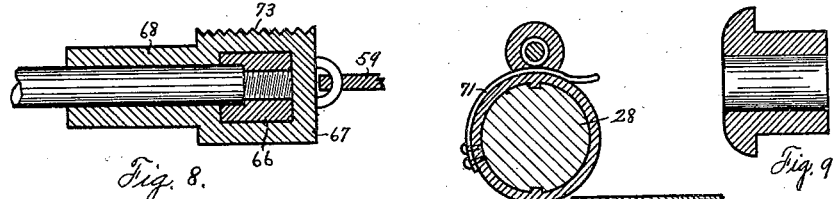
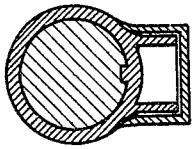
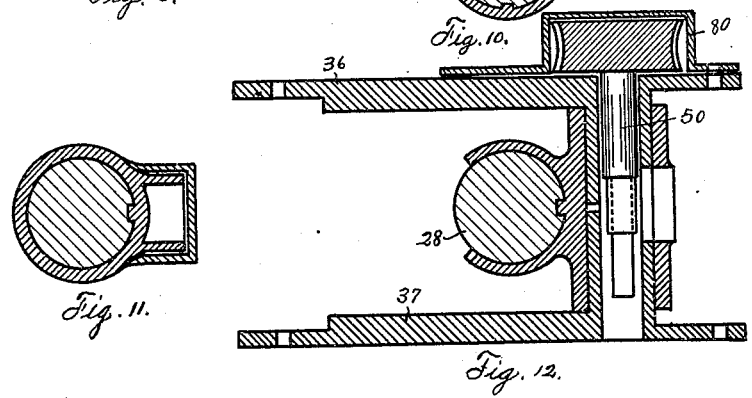
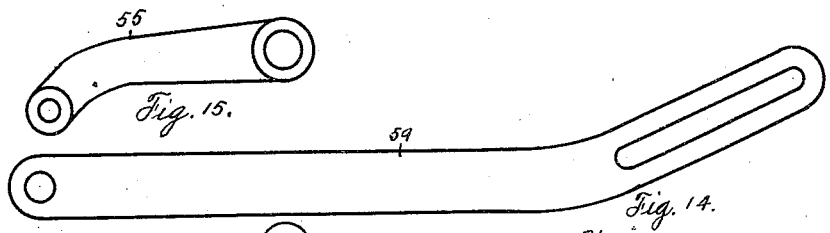
WITNESSES:
C Baylor Hull
May Montgomery
INVENTOR
Clarence B. Cummons
BY
Hardway & Cathey
ATTORNEYS

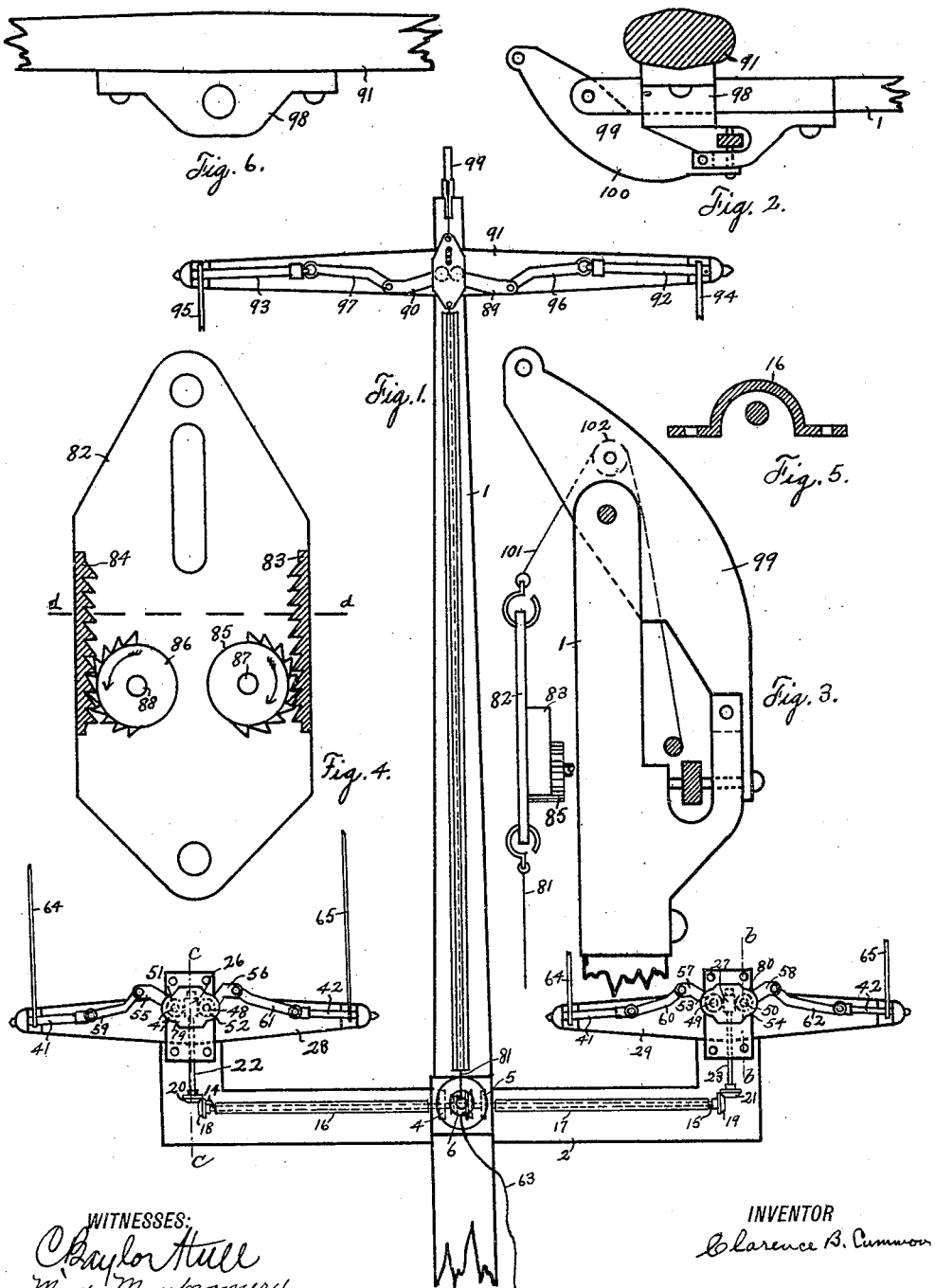

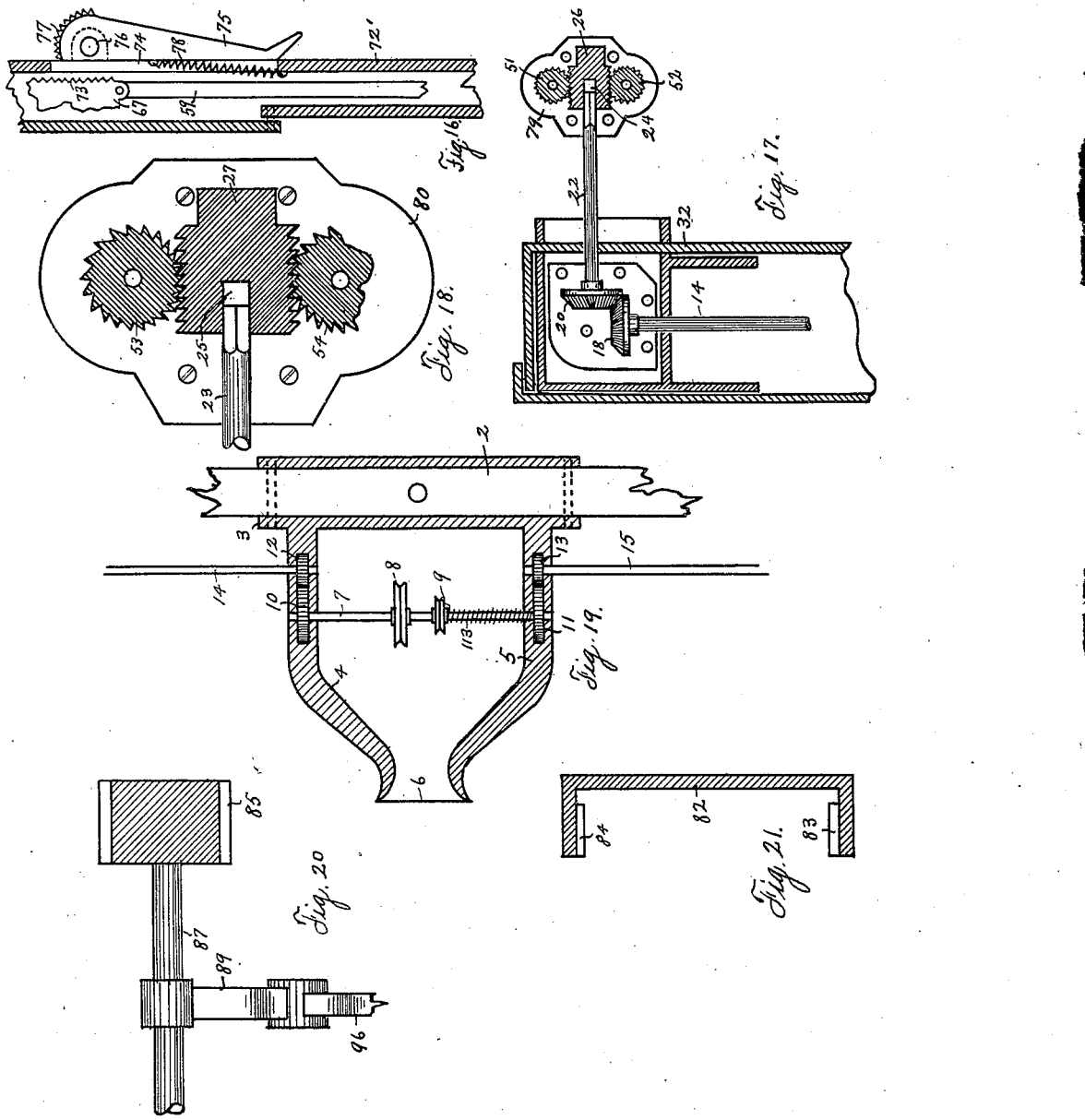

C. B. CUMMONS.
HORSE DETACHER.
APPLICATION FILED JUNE 3, 1913.
1,098,229.
Patented May 26, 1914.
4 SHEETS—SHEET 4.
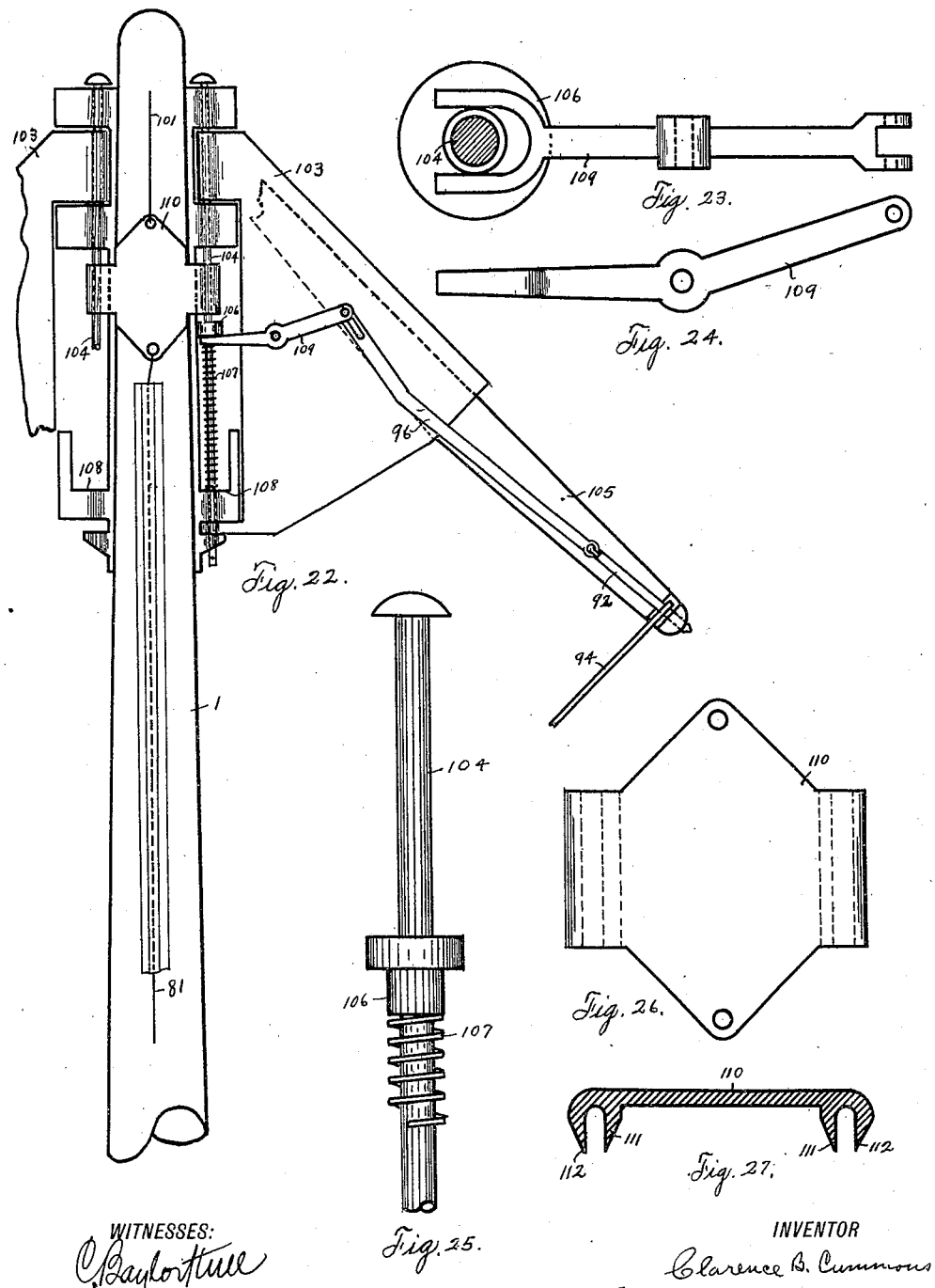
WITNESSES:
INVENTOR
Clarence B. Cummons
BY
ATTORNEYS

UNITED STATES PATENT OFFICE.

CLARENCE B. CUMMONS, OF PLAINVIEW, TEXAS.

HORSE-DETACHER.

1,098,229.  Specification of Letters Patent.  Patented May 26, 1914.

Application filed June 3, 1913. Serial No. 771,446.

*To all whom it may concern:*

Be it known that I, CLARENCE B. CUMMONS, a citizen of the United States, residing at Plainview, in the county of Hale and State of Texas, have invented certain new and useful Improvements in Horse-Detachers, of which the following is a specification.

This invention relates to new and useful improvements in horse detachers.

The objects of the invention are, in general, the provision of a device of the character described which will be inexpensive to manufacture, having ease of operation and devoid of complicated parts; specifically the provision of a double tree, swingle trees and breast yoke of novel and improved construction and of novel means for assembling them with each other and with the elements by which they are carried; and more particularly the novel means for detaching draft animals when attached to said breast yoke and swingle trees.

With the above and other objects in view, the invention has particular relation to certain novel features of construction, operation and arrangement of parts, an example of which is given in this specification and illustrated in the accompanying drawings, wherein—

Figure 1 shows a top plan view of the device. Figs. 2 and 3, show, respectively, side elevations of the end of the tongue and mechanism mounted thereon, shown partially in section. Fig. 4 is a fragmentary view of the operative mechanism for detaching the draft animals from the breast yoke. Fig. 5 is a sectional end view of the casing protecting the operating shafts used in connection with the device. Fig. 6 is a fragmentary view of the breast yoke. Fig. 7 is a longitudinal sectional view of one end of a swingle tree. Fig. 8 is a fragmentary sectional view of the tug bolt of the swingle trees, showing their operating rods attached thereto. Fig. 9 shows a sectional view of the bearings in which said bolt operates. Fig. 10 shows a sectional view of one end of the swingle tree, showing the means for locking the tug bolts in their withdrawn position. Fig. 11 shows a sectional view of one end of the swingle tree taken on the line $a$—$a$ of Fig. 7. Fig. 12 shows a sectional view of one of the swingle trees taken on the line $b$—$b$ of Fig. 1. Fig. 13 shows a sectional view of the swingle tree and its connection to the double tree, as taken on the line $c$—$c$ of Fig. 1. Figs. 14 and 15 show the link connections by which the tug bolts are connected to the mechanism for withdrawing the same. Fig. 16 shows a sectional view of a mechanism for manually withdrawing one of the tug bolts independent of the other. Fig. 17 is a fragmentary sectional view of the mechanism for withdrawing the tug bolts. Fig. 18 is an enlarged sectional view of a portion of the mechanism shown in Fig. 17. Fig. 19 is a fragmentary sectional view of a portion of the operating mechanism of the device. Fig. 20 is a fragmentary view, partially in section, showing the connections of the links shown in Figs. 14 and 15 with their operative mechanism. Fig. 21 is a sectional end view of the mechanism shown in Fig. 4. Fig. 22 is a fragmentary top plan view of the end of the tongue, showing in modified form the breast yoke and the mechanism for detaching the draft animal therefrom. Figs. 23 and 24 show front elevation and top plan views, respectively, of a portion of the detaching mechanism used in said modified form. Fig. 25 shows a fragmentary side elevation of the means through which said detaching mechanism is operated, and Figs. 26 and 27 show, respectively, top plan view and a sectional end view of a portion of the operating means of said detaching mechanism.

Referring now more particularly to the drawings wherein like numerals of reference designate similar parts in each of the figures, the numeral 1 designates the tongue and the numeral 2 refers to the double tree which is assembled with the tongue 1 by means of the ordinary linch pin (not shown) which passes through said double tree and tongue. Mounted upon the double tree 2 intermediate its ends is a plate 3 upstanding from which are two supports 4 and 5, spaced a distance apart and whose upper ends converge toward each other and carry the ring 6, integral therewith. Mounted in suitable bearings in the respective supports 4 and 5 is a shaft 7 which carries the pulleys 8 and 9, rigidly mounted thereon and upon the ends of the shaft 7 are rigidly mounted spur gear wheels 10 and 11 which mesh with similar gear wheels 12 and 13 fixed upon the inner ends of the respective shafts 14 and 15. These shafts 14 and 15 extend each way over the double tree and are incased by metallic hoods or protectors 16 and 17. The outer ends of the shafts 14 and 15 carry, respectively, rigidly mounted bevel gear wheels 18 and 19, which mesh, respectively with the bevel gear wheels 20 and 21 rigidly mounted upon the rear ends of the respective shafts 22 and 23. The forward ends of the last mentioned shafts are square and project into similarly shaped bearings, such as 24 and 25 in the screw gears 26 and 27 so as to be slidable therein and at the same time to impart rotation to said screw gears.

Swingle trees 28 and 29 are carried by the respective ends of the double tree 2 and are connected in the manner shown in Figs. 12 and 13, so that the swingle trees will be resiliently connected to the double tree. Each end of the double tree has metallic plates 30 and 31 secured above and beneath the same and the front and rear edges are protected by means of metallic plates 32 and 33. A strong coil spring 34 is provided for each swingle tree, one end of which rests against the plate 32 and this spring is incased by a hood 35 whose forward end is bolted to the plates 36 and 37 which embrace the swingle tree 28 and to which said swingle tree is pivoted. As the spring 34 is interposed between the plate 32 of the double tree and the closed end of the hood 35, it is obvious that it will form a resilient cushion for the swingle tree and in case of a sudden forward movement of the draft animal the shock against the parts will be minimized by reason of said cushion. The swingle tree ends are illustrated in Fig. 7 and are protected by metallic hoods such as 38 and the extreme end of each hood is provided with guides 39 and 40, extending substantially at right angles to the body portion of the hood 38 and these guides are provided with alined apertures, designed to receive, slidably, the tug bolts 41 and 42. The tug bolts are incased and slidably mounted in suitable casings, such as 43 and each is surrounded by a coil spring 44, one end of which rests against an annular shoulder 45 of the casing 43 and the other end of which rests against an annular shoulder 46 of the tug bolt and the resistance of said spring normally tends to hold the tug bolt projected through the alined orifices of the guides 39 and 40.

Two short vertical shafts 47, 48 and 49, 50 are provided for the respective swingle trees 28 and 29 which extend through the plates 36 and into the bearings of the double tree upon which the swingle trees pivot, as shown in Fig. 12. On the upper ends of these shafts are rigidly mounted screw gears 51, 52, 53 and 54. The screw gears 26 and 27 are located between the screw gears 51, 52, and 53, 54, respectively, and mesh therewith and rotation is imparted from the former to the latter.

The shafts 47, 48, 49 and 50 have the arms 55, 56, 57 and 58, respectively, fixed thereto which project forwardly therefrom. The free ends of the arms 55 and 57 are connected, respectively, to the tug bolts 41 by the links 59 and 60 and the free ends of the arms 56 and 58 are connected to the tug bolts 42, respectively, by means of the links 61 and 62.

The teeth of the gear wheels 51 and 52 are so inclined that said gear wheels will rotate in opposite directions, as the gear 26 is turned and the same is true of the gear wheels 53 and 54 with respect to the gear 27.

A cable 63 is provided which is attached to and wound around the pulley 8, its free end passing through the ring 6 and being within reach of the driver. When it is desired to detach the draft animals, the cable 63 may be pulled which will operate through the pulley 8 to rotate the shaft 7 from which, through the mechanism described, rotation will be imparted to the shafts 14, 15, 22 and 23 and to the respective gear wheels 26 and 27. As the gear wheel 26 rotates, the gear wheels 51 and 52 will rotate simultaneously and the arms 55 and 56 will be swung around forwardly and the tug bolts 41 and 52 withdrawn from the respective tugs 64 and 65 through the operation of the links 59 and 61 and in a similar manner when the gear wheel 27 is rotated rotation will be imparted simultaneously to the gear wheels 53 and 54 and the arms 57 and 58 swung around forwardly which will operate through the links 60 and 62 to withdraw the tug bolts 41 and 42 of the swingle tree 29 from their respective tugs 64 and 65.

The links 59, 60, 61, and 62 are connected to their respective tug bolts in the manner illustrated in Fig. 8 and will now be described:—

The inner end of each tug bolt is threaded and screwed thereupon is an enlarged head 66 which is rotatable, in an enlarged bearing 67 having a reduced neck 68 which surrounds the tug bolt but which prevents the withdrawing of the head 66 from its bearing 67 and the respective links are connected to their respective bearings 67, this mechanism being provided so as to permit the tug bolts to rotate while being withdrawn from their tugs.

Experience shows that the rear side of the tug bolts will be worn by the tugs and notches formed in which the tugs will engage; said notches would prevent the direct withdrawal of the tug bolts. To overcome this obstacle, in each of the tug bolts I have provided a spiral groove 69 and have arranged in said casing a set bolt 70 whose outer end projects into the corresponding groove 69. As the tug bolts are withdrawn they are forced to partially rotate because of the engagement of the inner end of the set bolt 70 with the spiral groove 69 and the notches which may be worn in the rear side of the tug bolts will thus be carried out of engagement with the tug and an easy withdrawal of the tug bolts will thus be permitted.

Secured to each end of each swingle tree is a flat spring 71 which is bolted to the swingle tree at one end and whose other end is free but normally rests in a peripheral slot 72 underneath the reduced neck 68. When the tug bolt is pulled back to release it from the tug and the free end of the neck 68 clears said spring, the resiliency of the spring causes the free end thereof to rise into engagement in front of the neck 68 and the tug bolt is thereby locked in its withdrawn position. When it is desired to rehitch the draft animals to the swingle trees the spring 71 may be manually depressed and the tug bolt will be released to the pressure of the spring 44 which will operate to project said tug bolt through the opening in the tug provided therefor.

In actual construction, it is contemplated that the arms and links operating the tug bolts, as hereinbefore described, will be entirely incased, but this incasement forms no part of the invention and only a fragmentary view thereof has been shown in Fig. 16 and indicated by the numeral 72'.

It will often be found desirable to release only one of the tug bolts and in order to effect this end, I have provided ratchet teeth 73 along one side of the bearing 67 and have cut an oblong slot 74 through one side of the casing 72 alined with the teeth 73. A small lever 75 is pivoted at the point 76 to the side of the casing 72 and the pivot end thereof has a segmental rack 77. As said lever is swung around on its pivot the rack 77 is brought into engagement with the rack teeth 73 and the tug bolt connected with the corresponding bearing member is withdrawn as said bearing member is forced back through the agency of said lever 75 and its segmental rack 77. When the lever 75 is released it is pulled back to its original position by means of the spring 78, one end of which is attached to the inner side of said lever and the other end of which is attached to the casing 72. The gear wheels 26, 51 and 52 are hooded over and protected by a hood 79 and the gear wheels 27, 53 and 54 are hooded over and protected by a similar hood 80, said hoods 79 and 80 being secured to the plate 36. One end of the cable 81 is attached to the pulley 9 and said cable passes along the tongue 1 and is incased by a hood similar to the hood 16, shown in Fig. 5. The other end of this cable 81 is attached to the metallic plate 82 through which the mechanism for detaching the draft animals from the breast yoke is operated. This mechanism will now be described.

Depending from each side of the plate 82 are the rack members 83 and 84 whose inner faces have rack teeth which mesh, respectively, with the rack teeth of the respective gear wheels 85 and 86, fixed to the respective shafts 87 and 88. These shafts are rotatably mounted in bearings carried by the breast yoke and as a pull is exerted on the cable 81 the plate 82 is moved rearwardly and corresponding rotation is imparted to the gear wheels 85 and 86 in opposite direction as indicated by arrows in Fig. 4.

Fixed to the respective shafts 87 and 88 are the arms 89 and 90 which project out rearwardly therefrom. The ends of the breast yoke 91 are in all respects similar to the ends of the swingle trees, as shown in Fig. 7 and are provided with tug bolts 92 and 93 provided to project through the breast straps 94 and 95. The outer ends of the respective arms 89 and 90 are connected to the inner ends of the respective tug bolts 92 and 93 by means of the respective links 96 and 97. As the gear wheels 85 and 86 are rotated, as hereinbefore indicated, the arms 89 and 90 are swung around rearwardly and a pull is exerted on the tug bolts 92 and 93 through the links 96 and 97 and said tug bolts are released from the respective breast straps 94 and 95. The free end of the tongue 1 extends through a bearing 98 fixed to the underside of the breast yoke 91.

In case the team is suddenly detached while running away, or when going at a rapid rate, and the vehicle is provided with a tongue whose free end drops to the ground when the draft animals are detached, the free end of the tongue is liable to engage with the surface of the ground and the tongue be broken by reason of the momentum of the vehicle. To guard against this, I have provided a runner 99 which is attached to the free end of the tongue, as shown in Figs. 2 and 3, whose forward end is up turned and whose underside tapers to an edge 100. This runner prevents the engagement of the end of the tongue with the ground and serves to prevent the tongue from deflecting to one side and causing the vehicle to over turn.

In case it is desired to hitch one team in front of another and to the end of the tongue 1, a cable 101 is provided, one end of which is attached to the front end of the plate 82, said cable passing around the pulley wheel 102, carried by the runner 99 and its other end being attached to a mechanism similar to that hereinbefore described and operating in the same manner to detach the team in front.

In Fig. 22 I have shown a modified form of the breast yoke which will be found best adapted to be used in connection with a stiff vehicle tongue, or one which does not drop down when the draft animals are detached. This modified form will now be described.

Triangular plates 103, 103 are hinged to each side of the tongue by means of shafts 104, 104 which pass through hinge members carried by the sides of the tongue and plates 103, 103, respectively. Each of the plates 103 has a breast yoke 105, said yokes diverging laterally on each side of the tongue. The outer end of each yoke 105 is constructed in a manner similar to the outer end of the swingle tree 28, as shown in Fig. 7, having the tug bolts such as 92 and 93 connected to the links such as 96 and 97. Each shaft 104 has a bearing member 106 slidably mounted thereon and surrounding each shaft is a coil spring 107 which is interposed between said bearing member 106 and the shoulder 108 carried by the side of the tongue 1. Pivoted to each plate 103 is a lever 109. One end of this lever is pivoted to the inner end of the link 96 of Fig. 22 and the other end of said lever is bifurcated and its fingers embrace the corresponding shaft 104 immediately in the rear of the bearing member 106. A plate 110 is disposed over the free end of the tongue, each side of which has two depending flanges, indicated by the numerals 111 and 112, respectively, which embrace the respective shaft 104 immediately in front of the bearing member 106 and to the rear end of which the cable 81 is attached. A rearward pull on said cable imparts a corresponding movement to the plate 110 and to the bearing member 106. A forward movement is thereby imparted to the outer end of the lever 109 which operates through the links 96 to withdraw the tug bolts 92, of Fig. 22, from their respective breast straps. When the draft animals are detached the yokes 105 drop down and serve as runners which support and direct the tongue in case the vehicle is in rapid movement when the draft animals are detached. It is to be observed that the links 59, 60, 61, 62 and 96 have a slidable connection with their respective arms so that in case the tug bolt connected with either one of said links is withdrawn independent of each other that its corresponding link will have sufficient play to permit the withdrawal thereof. Surrounding the shaft 7 is a strong coil spring 113, one end of which is attached to the support 5 and the other end of which is attached to said shaft. When a pull is exerted on the cable 63 and the same is unwound from said pulley 8, the cable 81 is wound upon the pulley 9. The rotation of the shaft 7, however, creates a tension on the spring 113 and when the cable 63 is released, the tension of the said spring operates to reverse the rotation of the shaft 7 and rewinds the cable 81 from the pulley 9 so that the mechanism will be in its original position and ready to again release the draft animals when they are hitched thereto.

What I claim is:—

1. In a device of the class described a supporting element; a breast yoke mounted thereon, harness engaging means carried by the remote terminals of the breast yoke, a pair of gear wheels rotatably mounted with respect to the breast yoke, a plate and a rack member depending from each side thereof, said rack members meshing with said respective gear wheels, a laterally extending arm fixed to the shaft of each gear wheel; links connecting the free ends of said arms with the harness engaging means carried by the breast yoke terminals, and means for moving said plate.

2. In a device of the class described a tongue, a double tree and a breast yoke pivoted to the tongue, swingle trees pivoted to the double tree, harness engaging means carried by the terminals of the breast yoke and swingle trees, a pair of gear wheels mounted upon the breast yoke and also a pair of gear wheels mounted upon each of the swingle trees, a shaft for each gear wheel, an arm fixed to each of said shafts and arranged to swing around as its corresponding gear wheel is rotated, a link connecting the free end of each arm with the harness engaging means of the corresponding terminal of the element by which said means is carried and means for simultaneously rotating said gear wheels.

3. In a device of the class described, a tongue, a double tree and a breast yoke pivoted to the tongue, swingle trees pivoted to the double tree, harness engaging means slidably secured to the terminals of the breast yoke and swingle trees and arranged to move lengthwise relative thereto, a pair of gear wheels mounted upon the breast yoke and a pair of gear wheels mounted upon each of the swingle trees, an arm operatively connected with each gear wheel and arranged to swing around as its corresponding gear wheel is rotated, a link connecting the free end of each arm with the harness engaging means of the corresponding terminal of the element by which said means is carried, means for simultaneously rotating said gear wheels, and means engaging with the harness engaging means and causing a partial rotation thereof during their lengthwise movement.

4. In a device of the class described, a tongue, a double tree mounted thereon, swingle trees pivoted to the double tree, harness engaging means carried by the terminals of the swingle trees, a pair of gear wheels rotatably mounted upon each swingle tree and spaced apart, an arm operatively connected with each of said gear wheels and arranged to swing around as its gear wheel is rotated, a link connecting the free end of each arm with the harness engaging means of the corresponding terminal of its swingle tree, a shaft rotatably mounted upon the double tree, a bevel gear wheel fixed upon each end of said shaft, a screw gear located between and meshing with the respective gear wheels of each swingle tree, a shaft for each of said screw gears for imparting rotation thereto, a bevel gear carried by each of said last mentioned shafts which mesh with the corresponding bevel gear wheels of the first mentioned shaft and means for rotating the first mentioned shaft.

5. In a device of the class described, a tongue, a double tree mounted thereon, swingle trees pivoted to the double tree, a pair of gear wheels rotatably mounted upon each swingle tree and spaced apart, an arm operatively connected with each of said gear wheels and arranged to swing around as its gear wheel is rotated, horse detaching means carried by the terminals of the swingle trees and operatively connected with said arm, a shaft rotatably mounted upon the double tree, means for rotating the same, a bevel gear wheel fixed upon each end of said shaft, a screw gear located between and meshing with the respective gear wheels of each swingle tree, a shaft for each of said screw gears slidably connected therewith and imparting rotation thereto, a bevel gear fixed upon each of said last mentioned shafts which mesh with the corresponding bevel gear wheels of the first mentioned shaft.

6. In a device of the character described, a swingle tree, a pair of gear wheels rotatably mounted thereon and spaced apart, an arm operatively connected with each of said gear wheels and arranged to swing around as its gear wheel is rotated, horse detaching means carried by the terminals of the swingle tree and operatively connected with said arms, a screw gear located between and meshing with said gear wheels and means for rotating said gear wheels.

7. In a device of the class described, a supporting element, a double tree and a breast yoke pivoted thereto, swingle trees pivoted to the double tree and having a resilient connection therewith, harness engaging means carried by the terminals of the breast yoke and the swingle trees, a pair of gear wheels mounted upon each of the swingle trees, a shaft for each gear wheel, an arm fixed to each of said shafts and arranged to swing around as its corresponding wheel is rotated, a link connecting the free end of each arm with the harness engaging means of the corresponding terminal of the swingle tree by which said means is carried, means for simultaneously rotating said gear wheel, and a mechanism operatively connected with the harness engaging means carried by the terminals of the breast yoke and operating the same simultaneously with the harness engaging means carried by the terminals of the swingle tree.

In testimony whereof I have signed my name to this specification in the presence of two subscribing witnesses.

CLARENCE B. CUMMONS.

Witnesses:
MAY MONTGOMERY,
J. C. CARPENTER.

---

Copies of this patent may be obtained for five cents each, by addressing the "Commissioner of Patents, Washington, D. C."